INVENTOR
MICHEL BOUGON

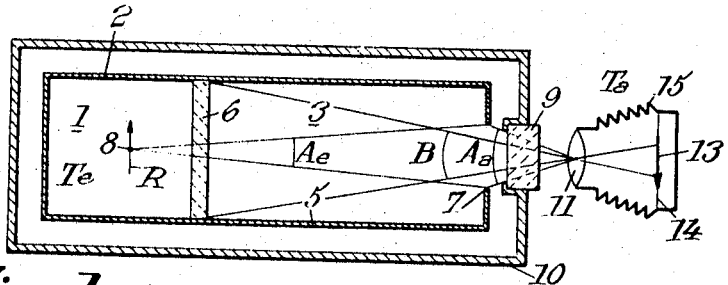
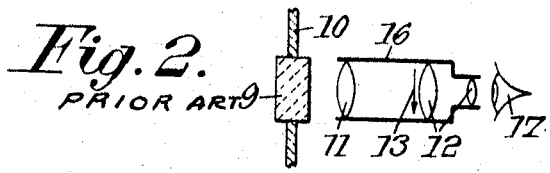
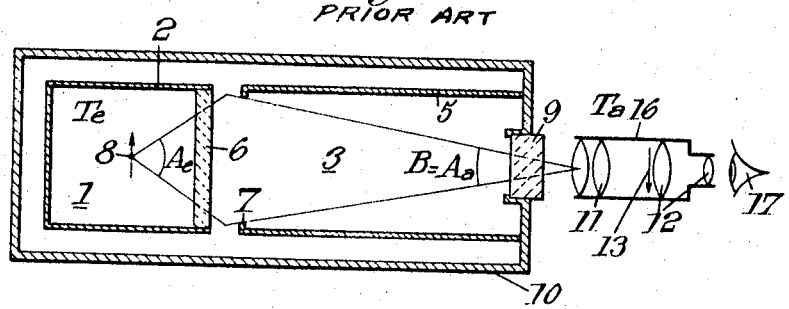
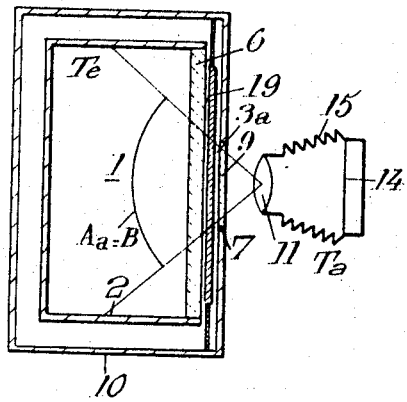 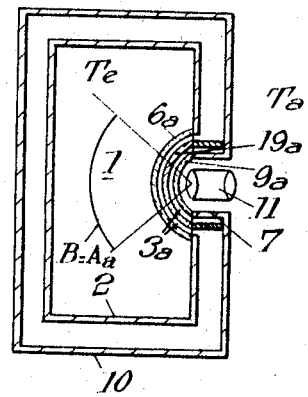

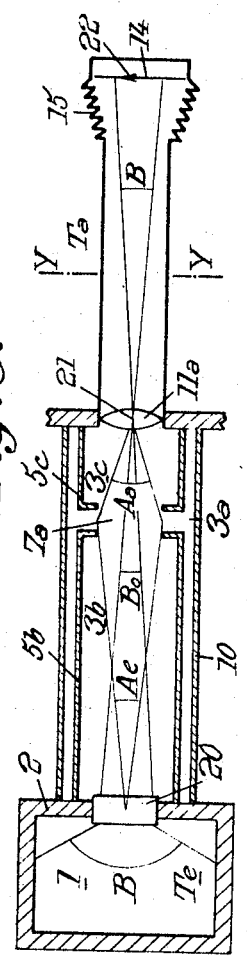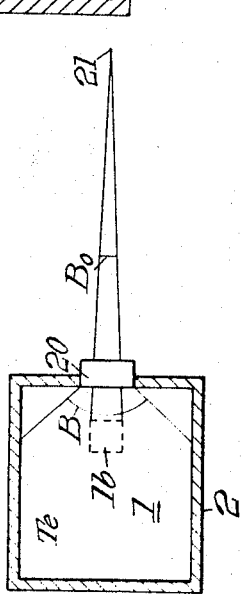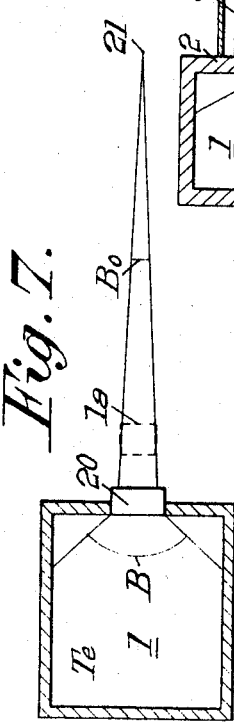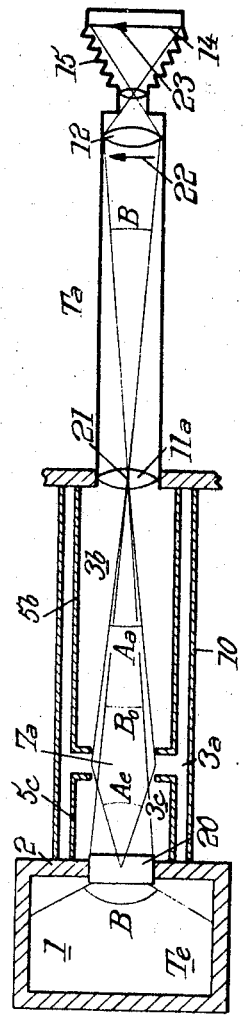

United States Patent Office 3,447,434
Patented June 3, 1969

3,447,434
APPARATUS FOR OBSERVING AND PHOTOGRAPHING OBJECTS IN CLOSED SPACES
Michel Bougon, Versailles, France, assignor to Commissariat à l'Energie Atomique, Paris, France, an organization of France
Filed Apr. 10, 1967, Ser. No. 629,500
Claims priority, application France, Apr. 25, 1966, 58,934
Int. Cl. G03b 17/55
U.S. Cl. 95—11   10 Claims

ABSTRACT OF THE DISCLOSURE

An apparatus for observing or photographing objects in a closed space having a first and second optical system and an evacuated chamber. The first optical system gives an image of an object located in the closed space. The second optical system provides a second image of the first image on an image receiver or observer's eye-piece. The evacuated chamber is divided into two portions separated by an orifice. Each portion is surrounded by a thermal screen. The orifice is movable so as to be located at a smaller distance from the end of the chamber at the lower temperature.

---

The present invention relates to devices for observing or photographing objects in closed spaces. It is more especially concerned with devices for observing or photographing objects under a wide angle in closed spaces at very high or very low temperature.

Its chief object is to improve such devices in such manner as to reduce thermal interchanges (in particular by radiation) between the closed space and the ambient medium (in particular with the observation or photographic optical device) and to improve the quality of the images formed by this optical device (in particular on a photographic plate, on the mosaic of a television view recording tube, or on the observer's eye retina).

The essential feature of this invention consists in the combination of an evacuated chamber of elongated shape, located adjacent the closed space in which is located the object, advantageously a first wide angle optical system disposed between said space and said chamber and giving a first image, either real or virtual of reduced size, of said object, and a second small angle optical system disposed near end of said chamber remote from said closed space and giving a second image of the first image, this second image being either formed on an image receiver, or projected by an eye-piece on the observer's retina or on an image receiver, this chamber being divided into two portions, each of which is surrounded by a thermal screen, said portions being separated from each other by a transverse orifice disposed in the vicinity of the zone (either closed space or second optical system) which is located at the higher temperature.

Preferably the thermal screen disposed in the vicinity of the first optical system is either kept at the temperature of the closed space or either overcooled (if the closed space is at low temperature) or overheated (if the closed space is at high temperature) with respect to the temperature of the closed space, whereas the thermal screen in the vicinity of the second optical system is either kept at the ambient temperature or either overheated or overcooled with respect to the ambient temperature in the case of a cold or hot closed space, respectively.

The invention is more especially concerned with observation or photography in cryogenic closed spaces, hot closed spaces, the optical systems in satellites and infra-red ray systems.

Preferred embodiments of the present invention will be hereinafter described with reference to the appended drawings, all of which are longitudinal sectional views, given merely by way of example, and in which:

FIG. 1 shows a known photographic device in a cold closed space, working under a small angle;

FIG. 2 shows a modification of the right hand side portion of the device of FIG. 1 corresponding to an observation device in the same conditions;

FIG. 3 shows a known observation device in a hot closed space, working under a small angle;

FIGS. 4 and 5 show two known embodiments of a photographic or observation device working under wide angles, such devices having some drawbacks which are obviated by the present invention;

Figure 11:
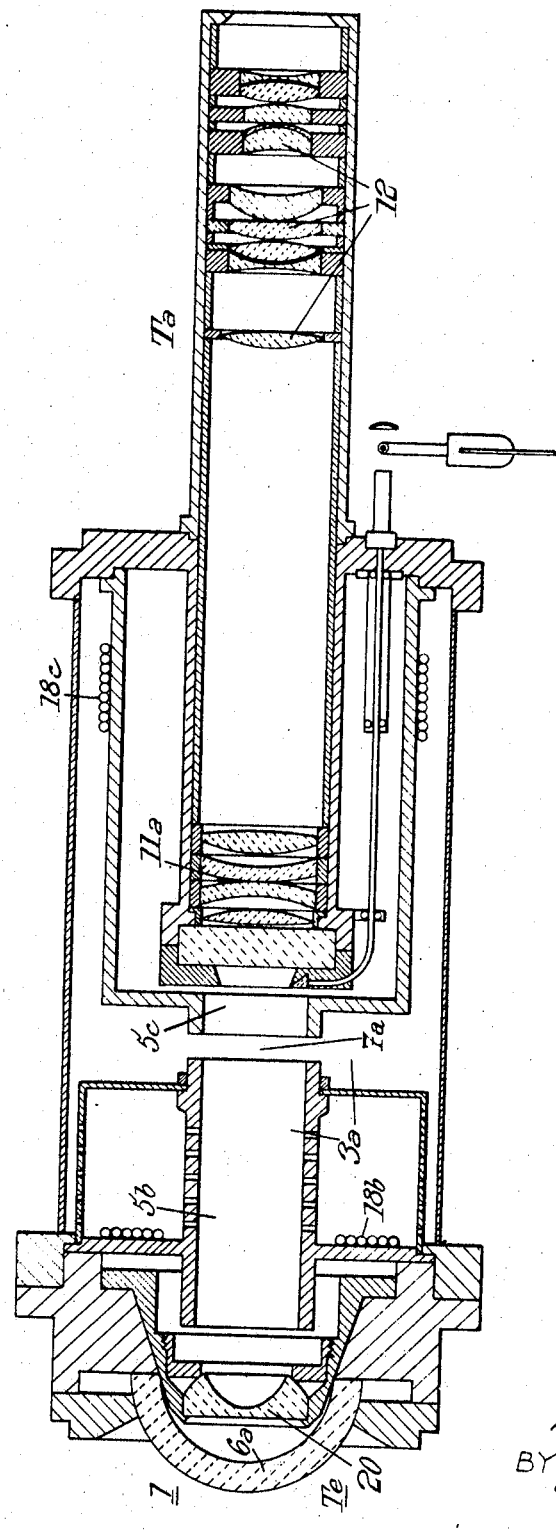

FIGS. 6 and 7 diagrammatically illustrate the principle of the present invention in the cases of a real and of a virtual first image, respectively, with a wide angle first optical system.

FIGS. 8 and 10 illustrate the invention for producing a device capable of photographing very cold and very hot closed spaces, respectively;

FIG. 9 illustrates a modification of the right hand portion of the device of FIG. 8 for obtaining an observation device;

FIG. 11 illustrates a device according to the present invention shown in a more detailed fashion.

Before describing embodiments of the invention, the present state of the art will first be stated with reference to FIGS. 1 to 5 inclusive.

When is it desired to observe or to photograph a closed space at a temperature $Te$ very different from the ambient temperature $Ta$, that is to say either very cold or very hot, it is necessary to consider whether the angle of field B, for observation or photography, is small or large. The first case will be discussed with reference to FIGS. 1 to 3, the angle of field being supposed to be smaller than or equal to 25° for instance. In the case of FIGS. 4 and 5, this angle is large and ranges for instance from 90° to 130°.

As a matter of fact, when the angle of field, for observation or photography, is lower than or equal to 25° (FIG. 1, FIG. 3), no particular difficulties are met with. Insulation for the transfer of heat by conduction is obtained by making use of an evacuated chamber, whereas insulation for the transfer of heat by radiation is negligible due to the fact that the solid angles through which the heat interchanges would take place are very small.

FIG. 1 shows a device of a known type for photographing objects in a closed space under a small angle. This figure shows space 1, enclosed within walls 2 and at a very low temperature $Te$ (for instance a cryogenic temperature) and evacuation chamber 3 limited by a wall including a thermal screen 5. An insulating glass plate 6 is located between cold space 1 and evacuated chamber 3, this glass plate being preferably made of optical glass and having its faces as parallel to each other as possible. An orifice or diaphragm 7 is provided in the end wall of chamber 3 opposed to glass plate 6, this orifice limiting the solid angle $Ae$ which is a measure of the energy exchanged between a point 8 of space 1 at temperature $Te$ and the portion, at ambient temperature $Ta$, located behind orifice 7. Another glass plate 9 is located between chamber 3 and the ambient medium, this plate 9 having the same characteristics as plate 6. The whole is housed in a casing 10 which separates it from the ambient medium.

An optical system 11 gives an image of an object such as R located in space 1, this image 13 being located in the plane 14 of an image receiver such as a photographic plate or film or the mosaic of a television camera. FIG.

1 shows the case where the optical system 11 is the object lens of a photographic camera 15.

Orifice 7 also limits the solid angle $Aa$ which determines the exchange of energy between the ambient optical system 11 and cold space 1.

The same arrangement may be used for visual observation by modifying the right hand side of the device of FIG. 1 as shown by FIG. 2. In this case the optical system 11 is the object lens of a telescope 16 the eye-piece 12 of which projects the image 13 formed by optical system 11 on the retina of eye 17.

FIG. 3 shows the case of a closed space 1 located at a very high temperature $Te$.

The arrangement in casing 10 is the same as that shown by FIG. 1. The observation device comprises, as in the case of FIG. 2, a telescope 16 including an optical system 11 forming the object lens and an eye-piece 12 opposite which eye 17 is located.

In the case where the temperature $Te$ of space 1 is lower than the temperature $Ta$ of the ambient medium (FIG. 1), thermal screen 5 is either connected with space 1 or kept at a temperature close to $Ta$. On the contrary, if space 1 is at a temperature $Te$ higher than the temperature $Ta$ of the ambient medium (FIG. 3), screen 5 is connected to casing 10 or is kept at a temperature close to $Ta$. In this case also, solid angle $Ae$ measures the energy exchanged between a point 8 of closed space 1 and the ambient medium located behind orifice 7 whereas solid angle $Aa$ measures the energy exchanged between the optical system 11 at ambient temperature and space 1.

As the intensities of radiation are proportional to the fourth power of the absolute temperature and to the solid angle, it will be seen that devices such as illustrated by FIGS. 1 and 3 reduce the heat exchanges to a minimum, because they associate with the higher absolute temperature the smaller solid angle and to the lower absolute temperature the larger solid angle ($Aa$ is greater than $Ae$ when space 1 is at a temperature $Te$ lower than the ambient temperature $Ta$ and vice versa).

These two kinds of observation and photographic devices give good results owing to the fact that the observation angle B is small and that, as a consequence, the corresponding solid angles $Aa$ or $Ae$ are small, whereby the thermal interchanges have a low value. The lowering or raising of temperature of the optical system 11 which results from this thermal interchange is small and therefore does not substantially disturb the operation of the optical system. On the contrary, if the observation angle B becomes great, for instance ranges from 90 to 130°, it is no longer possible to neglect the heat interchanges by radiation and these interchanges are reduced as much as possible by making use either of a flat thermal shield 19 provided between the two flat glasses 6 and 9, or of a spherical thermal shield 19a provided between two spherical glass elements 6a and 9b (FIGS. 4 and 5). It will be seen that, in this case, the angle of field B is great. As the plane angle $A'a$ is equal thereto, solid angle $Aa$ is also very great. This angle $Aa$, through which the optical system loses heat (if closed space 1 is at very low temperature) or receives heat (if closed space 1 is at very high temperature) has become very important and therefore the interchange of heat by radiation between the closed space and optical system 11 is very great. On the other hand, the separating vacuum (consisting of the evacuated chamber 3 of FIGS. 1 and 3) has practically disappeared (however it is possible to provide evacuated zones 3a). It is therefore shield 19 or 19a which must supply the thermal insulation while permitting observation or photography.

Such a shield 19 or 19a, if it were perfectly efficient, would reflect all the infra-red radiation up to 10 microns (which corresponds for practical purposes to the whole transfer of heat), while transmitting practically all visible rays to permit a good observation or a good photography. Unfortunately, such shields do not exist at the present time and it is necessary to be satisfied in the present device with a shield consisting of a thick sheet of optical glass either plate, as shown at 19, or spherical as shown at 19a. Now, such a sheet involves the following drawbacks:

The efficiency of the shield is low, or even very low, because most of the heat rays pass through this sheet;

This glass sheet gets hot or cold by absorption or emission of infra-red rays coming from closed space 1 if the latter is hot or going toward said space 1 if the latter is cold; this causes the existence of temperature gradients and therefore of refractory index gradients in the glass of the sheet, these gradients seriously modifying the performances of the optical system (resolution, distortion, accuracy);

The presence of sheet 19 or 19a in the optical system tends to reduce the constant thereof due to the fact that a supplementary glass sheet is interposed.

The object of the present invention is to obviate these drawbacks by transforming the problem of thermal insulation by radiation under a great field angle into a problem of thermal insulation by radiation under a very small field angle, this last problem being easy to solve, as above indicated with reference to FIGS. 1 and 3, whereas the first problem is very difficult and its known solutions involve the above mentioned drawbacks, illustrated with reference to FIGS. 4 and 5.

An observation, or photography device, according to the present invention, is illustrated by FIGS. 6 to 11. It comprises, in combination, a first optical system 20 having a wide field (plane aperture angle B) giving of the closed space 1, a first image, either real 1a, or virtual 1b, of small size, which is observed from a distance, for instance from a point 21 under a small angle $B_0$ (for instance smaller than or equal to 15°) through a second optical system 11a (FIGS. 8 and 10), both in the case where closed space 1 is at a very high temperature, and in that where it is at a very low temperature.

On the other hand, there is provided between closed space 1 and optical system 11a, an evacuated chamber 3a of elongated shape, this chamber consisting of two spaces 3b, 3c each of which comprises a thermal screen, respectively 5b and 5c, and which are separated from each other by a transverse orifice 7a, this orifice being located in the vicinity of the region at the highest temperature (closed space 1 in the case of FIG. 10 or second optical system 11a in the case of FIG. 8).

Optical system 11a gives an image 22 of the small size image 1a or 1b of closed space 1. This image 22 may be:

Either received directly at 14 on an image receiver (photographic film or plate or mosaic of a television camera), as in the case of FIG. 8, the whole of the optical systems being analogous to an inverted Galilean telescope, Or be observed through an eye-piece 12 by eye 17 (case of FIG. 9 which shows a modification of the portion of FIG. 8 located on the right hand side of line YY), Or again be projected through a lens 12, with enlargement or reduction of size at 23 upon an image receiver located at 14 (photographic film of plate or mosaic of a television camera), as illustrated by FIG. 10.

Accordingly as closed space 1 is at a temperature $Te$ well above the ambient temperature $Ta$ (FIG. 10) or, on the contrary, at a temperature $Te$ well below this temperature $Ta$ (FIG. 8) the spaces 3b and 3c and thermal screens 5b and 5c are disposed in different manners, both arrangements being, however, symmetrical which is very advantageous because it is possible to use the same system 3a comprising spaces 3b and 3c in two different manners by turning it over so as to pass from one case to the other.

The two thermal screens 5b and 5c are normally one at temperature $Te$ of closed space 1 (that located in the vicinity of said space) and the other at the ambient temperature $Ta$ (the thermal screen located in the vicinity of optical system 11a). The two thermal screens 5b and 5c are separated from each other by orifice 7a which corresponds, on the one hand, to the solid angle $Ae$ under which the first optical system 20 sees the ambient temperature $Ta$, and, on the other hand, solid angle $Aa$ under which the second optical system 11a sees the temperature of the closed space $Te$. It will be noted that, according to an ambient feature of the invention, plane $Bo$ under which image 1a or 1b is seen, is of the same order of magnitude as the plane angle in the embodiments of FIGS. 1 and 3, which permits observation or photography under a wide angle $A$, while giving small solid angles $Aa$ and $Ae$ for the transfer of the heat fluxes.

The position of orifice 7a between the two optical systems 20 and 11a may be chosen at will in such manner as to vary the thermal power that those optical systems supply and receive. At a matter of fact, this orifice 7a is located nearer the region at the higher temperature, that is to say nearer the second optical system 11a than the first optical system 20 in the case where closed space 1 is at a temperature $Te$ lower than the ambient temperature $Ta$, whereas it is located nearer the first optical system 20 than the second optical system 11a in the case where closed space 1 is at a temperature $Te$ higher than the ambient temperature $Ta$.

In the same applications of the invention, it is of advantage to dispose orifice 7a in such manner that the thermal powers transmitted through solid angles $Ae$ and $Aa$ are equal. Now, it is known, as above stated, that thermal powers are proportional to the fourth power of the temperature and to the solid angles. Therefore the system is arranged so that, in the embodiment of FIG. 8 and in that of FIG. 10

$$(Te)^4 \cdot Aa = (Ta)^4 \cdot Ae$$

By calling $A'e$ and $A'a$ the plane angles corresponding respectively to solid angles $Ae$ and $Aa$:

$$Aa: \frac{A'a}{A'e}\left(\frac{Ta}{Te}\right)^2$$

Example: If $Te=28°$ K. and $Ta=280°$ K., then $A'a/A'e=100$; a solution is for instance given by $A'a=180°$ and $A'e=1.8°$.

Even if, for optical or mechanical reasons, as it is the case above, the values found for these angles were not acceptable, it is still possible (for instance FIG. 8) to try to render equal the radiated thermal powers by overcooling the low temperature screen 5b on the cold side and overheating the hot screen 5c on the hot side, in such manner as to compensate by a reduction of the radiation of the cold screen, the excess of radiation through orifice 7a and to compensate through an excess of radiation of the hot screen the lack of radiation through this orifice. This is a possibility of very great practical importance.

FIG. 11 shows a particular embodiment of a device according to FIG. 8, it being supposed that it is desired to make observation in a closed space 1, consisting of a bubble chamber for the observation of nuclear phenomenons, this bubble chamber being provided with an observation window 6a consisting of a semi-spherical optical glass.

FIG. 11 shows the first optical system 20 (to which 6a also belongs), the two thermal screens 5b and 5c (screen 5b being normally kept at the cold temperature $Te$ of closed space 1, whereas screen 5c is kept at the ambient temperature $Ta$) disposed in space 3a, the second optical system 11a and the projection lens system 12 (FIG. 11 corresponds to the modification of FIG. 9 in the case of observation, or to the right hand side of FIG. 10 in the case of photography). The two isothermal screens 5b and 5c are made of copper. Cold thermal screen 5b is overcooled by means of a coil 18b, whereas hot thermal screen 5c is overheated by means of the coil 18c.

There is thus provided in all cases an observation or photography device which has over the observation or photography devices of the same kind existing at the present time many advantages, and in particular the following ones:

First, it permits of performing photography under a very great angle in closed spaces at very low or very high temperature, in particular in cryogenic spaces (cryostats, bubble chambers, etc.) in hot spaces (ovens, boilers, nuclear reactors, etc.) in optical systems fitted in satellites, when it is desired to separate the image receiver from the very low temperature of radiation of black space, and in infra-red systems to separate the ambient space from the very low temperature at which the infra-red image receiver is generally placed.

It permits of greatly reducing the thermal interchange, in particular by radiation, between the very hot or very cold closed space and the ambient space.

The optical quality of the images that are obtained on the eye retina or on an image receiver is excellent because any glass thermal sheet is eliminated between the closed space and the observation or photography optical system.

In a general manner, while the above description discloses what are deemed to be practical and efficient embodiments of the present invention, said invention is not limited thereto as there might be changes made in the arrangement, disposition and form of the parts without departing from the principle of the invention as comprehended within the scope of the claims.

What I claim is:

1. Apparatus for producing an image of an object located in a closed space at a temperature very different from ambient temperature which comprises:
    a wide angle first optical system capable of giving a first image, of reduced size, of any object in said closed space, and
    a small angle second optical system located at a distance from said first image and capable of giving a second image thereof,
    wherein the improvement consists in
        an evacuated chamber of elongated shape comprising two compartments in line with each other, and
        a thermal screen for each of said compartments respectively,
        a transverse orifice being provided in said evacuated chamber between said two compartments, said orifice being movable so that it is located at a smaller distance from the end of said chamber at the higher temperature than from the end of said chamber at the lower temperature.

2. Apparatus for producing an image of an object located in a closed space at a temperature very different from ambient temperature which comprises:
    a wide angle first optical system capable of giving a first image, of reduced size, of any object in said closed space, and
    a small angle second optical system located at a distance from said first image and capable of giving a second image thereof,
    wherein the improvement consists in
        an evacuated chamber of elongated shape extending between said first optical system and said second optical system and comprising two compartments in line with each other, and
        a thermal screen for each of said compartments respectively,
        a transverse orifice being provided in said evacuated chamber between said two compartments, said orifice being located at a smaller distance from the end of said chamber at the higher temperature than from the end of said chamber at the lower temperature.

3. A device according to claim 2 including means for keeping the thermal screen in the vicinity of the first optical system at the temperature of the closed space and means for keeping the thermal screen in the vicinity of the second optical system at ambient temperature.

4. A device according to claim 1 wherein the temperature of said closed space is lower than ambient temperature, including means for keeping the thermal screen in the vicinity of the first optical system at a temperature at most equal to that of said closed space and means for keeping the thermal screen in the vicinity of the second optical system at a temperature at least equal to ambient temperature.

5. A device according to claim 1 wherein the temperature of said closed space is higher than the ambient temperature, including means for keeping the thermal screen in the vicinity of the first optical system at a temperature at least equal to that of said closed space and means for keeping the thermal screen in the vicinity of the second optical system at a temperature at most equal to the ambient temperature.

6. A device according to claim 1 wherein the position of said transverse orifice in said evacuated chamber is such that the ratio to each other of the solid angles determined by said orifice and having their respective apexes on said first optical system and on said second optical system is substantially equal to the ratio to each other of the fourth powers of the respective values counted on the Kelvin scale, of the temperature in said closed space and of the ambient temperature.

7. A device according to claim 1 comprising a material image receiver, to receive said second image.

8. A device according to claim 1 comprising an eye-piece for projecting said second image onto the retina of an observer's eye.

9. A device according to claim 1 comprising a material image receiver and an eye-piece for projecting said second image onto said receiver.

10. A device according to claim 1 wherein said thermal screens are substantially isothermal.

References Cited

UNITED STATES PATENTS

| | | | |
|---|---|---|---|
| 1,724,566 | 8/1929 | Davidson | 95—11 |
| 2,482,814 | 9/1949 | Urbach | 95—11 |
| 2,482,815 | 9/1949 | Urbach | 95—11 |
| 3,353,014 | 11/1967 | Gallup | 240—1.3 |

NORTON ANSHER, *Primary Examiner.*

CHARLES E. SMITH, *Assistant Examiner.*

U.S. Cl. X.R.

240—1.3